(12) United States Patent
Zhang

(10) Patent No.: US 10,696,091 B2
(45) Date of Patent: Jun. 30, 2020

(54) APPARATUS HAVING A DECORATIVE PATTERN

(71) Applicant: Shine Optoelectronics (Kunshan) Co., Ltd., Kunshan (CN)

(72) Inventor: Jian Zhang, Kunshan (CN)

(73) Assignee: SHINE OPTOELECTRONICS (KUNSHAN) CO., LTD., Kunshan, Jiangsu (CN)

( * ) Notice: Subject to any disclaimer, the term of this patent is extended or adjusted under 35 U.S.C. 154(b) by 0 days.

(21) Appl. No.: 16/010,256

(22) Filed: Jun. 15, 2018

(65) Prior Publication Data

US 2018/0290485 A1    Oct. 11, 2018

Related U.S. Application Data

(63) Continuation of application No. PCT/CN2016/010036, filed on Dec. 15, 2016.

(30) Foreign Application Priority Data

Dec. 17, 2015   (CN) .................. 2015 2 10803834 U

(51) Int. Cl.
*B32B 3/30*   (2006.01)
*B32B 3/26*   (2006.01)
(Continued)

(52) U.S. Cl.
CPC ............. *B44C 5/04* (2013.01); *B32B 3/263* (2013.01); *B32B 7/12* (2013.01); *B44C 1/10* (2013.01);
(Continued)

(58) Field of Classification Search
CPC ..... B32B 3/263; B32B 7/12; B32B 2307/402; B32B 2307/416; B32B 2451/00;
(Continued)

(56) References Cited

U.S. PATENT DOCUMENTS

| 3,936,567 A * | 2/1976 | Vesely .................... B32B 27/00 428/325 |
| 2013/0004738 A1 * | 1/2013 | Jordan ..................... G02B 1/04 428/195.1 |

(Continued)

FOREIGN PATENT DOCUMENTS

| CN | 101391555 A | 3/2009 |
| CN | 103422453 A | 12/2013 |

(Continued)

OTHER PUBLICATIONS

International Search Report Issued in International Application No. PCT/CN2016/110036, Entitled Device Having Decorate Pattern, dated Mar. 22, 2017.

*Primary Examiner* — Joanna Pleszczynska
(74) *Attorney, Agent, or Firm* — Hamilton, Brook, Smith & Reynolds, P.C.

(57) ABSTRACT

Embodiments of this application disclose an apparatus having a decorative pattern. The apparatus comprises: a bearing layer having a first surface and a second surface opposite to each other; an adhesive layer provided on the first surface of the bearing layer; and a pattern layer provided on a surface in of the adhesive layer away from the bearing layer and the pattern layer comprising a body and a pattern structure integrated with the body. With the technical solution disclosed in the embodiments of this application, an overall thickness of the apparatus may be reduced.

12 Claims, 4 Drawing Sheets

(51) Int. Cl.
*B32B 7/12* (2006.01)
*G02B 3/00* (2006.01)
*G02B 3/08* (2006.01)
*G02B 5/04* (2006.01)
*G02B 5/08* (2006.01)
*B44C 5/04* (2006.01)
*B44C 1/10* (2006.01)

(52) U.S. Cl.
CPC ... *B32B 2307/402* (2013.01); *B32B 2307/416* (2013.01); *B32B 2451/00* (2013.01); *B32B 2551/00* (2013.01); *G02B 3/0006* (2013.01); *G02B 3/08* (2013.01); *G02B 5/04* (2013.01); *G02B 5/0808* (2013.01)

(58) Field of Classification Search
CPC ..... B32B 2551/00; B32B 3/30; G02B 3/0006; G02B 3/08; G02B 5/04
See application file for complete search history.

(56) References Cited

U.S. PATENT DOCUMENTS

| | | | |
|---|---|---|---|
| 2013/0215515 | A1* | 8/2013 | Kinoshita ............ G02B 3/0056 359/619 |
| 2014/0334021 | A1* | 11/2014 | Norton ............... G02B 13/0085 359/793 |
| 2015/0336312 | A1* | 11/2015 | Tanida ............. B29C 45/14688 264/135 |

FOREIGN PATENT DOCUMENTS

| | | |
|---|---|---|
| CN | 104943461 A | 9/2015 |
| CN | 205362001 U | 7/2016 |
| JP | 3813799 B2 | 8/2006 |
| WO | 20171001804 A1 | 6/2017 |

* cited by examiner

APPARATUS HAVING A DECORATIVE PATTERN

RELATED APPLICATIONS

This application is a Continuation of International Application No. PCT/CN2016/110036, which designates the United States and was filed on Dec. 15, 2016, published in Chinese, which claims priority to Chinese Application No. 2015210803834, filed on Dec. 17, 2015. The entire teachings of the above applications are incorporated herein by reference.

TECHNICAL FIELD

This disclosure relates to the field of optical films, and, in particular to an apparatus having a decorative pattern.

BACKGROUND

As the development of sciences and technologies, decorative films are widely used on surfaces of electronic products, such as a mobile phone, and a computer, etc., home appliances, such as a refrigerator, an air conditioner, and a washing machine, and vehicles, etc.

Currently, an in-mold decoration technique is generally used in the prior art to make a decorative film. In this technique, it is mainly to make a decorative layer having a needed visual effect on a bearing substrate, and then shape the bearing substrate, so as to obtain a decorative film. The obtained decorative film generally includes such structures as a bearing substrate, an adhesive layer, and a decorative layer, etc.; wherein, the decorative layer is generally of a multi-layer structure, and is mainly formed by making a pattern layer on a substrate.

In the implementation of this application, the inventor found that at least following problem exists in the prior art:

in the prior art, a substrate used for supporting a decorative layer is often provided in the decorative layer of a decorative film, which makes that the formed decorative film is relatively thick.

SUMMARY

An object of embodiments of this disclosure is to provide an apparatus having a decorative pattern, so as to reduce an overall thickness of the apparatus, that is, to reduce a thickness of a decorative film.

In order to solve the above technical problem, embodiments of this disclosure provide an apparatus having a decorative pattern, which is implemented as below:

The embodiments of this disclosure provide an apparatus having a decorative pattern, including:

a bearing layer having a first surface and a second surface opposite to each other;

an adhesive layer provided on the first surface of the bearing layer; and a pattern layer provided on a surface of the adhesive layer away from the bearing layer and the pattern layer comprising a body and a pattern structure integrated with the body.

In an embodiment, an accommodation structure is provided on the body, so as to form the pattern structure.

In an embodiment, the pattern structure is located at two opposite sides in the body.

In an embodiment, the pattern structure is located inside the body.

In an embodiment, the pattern structure is in a convex shape.

In an embodiment, the pattern structure comprises one of a prism, a microlens and a Fresnel lens, or a combination thereof.

In an embodiment, a surface of the bearing layer comprises a plane, or a curved surface, or a combination thereof.

In an embodiment, an included angle between an edge of the surface of the bearing layer and a horizontal direction is 0-90 degrees.

In an embodiment, the bearing layer comprises a glass, or a metal plate, or a film.

In an embodiment, the apparatus further comprises a reflective layer, the reflective layer being provided on a surface of the pattern structure away from the bearing layer.

In an embodiment, the apparatus further comprises a colored layer, the colored layer being provided on a surface of the reflective layer away from the pattern layer.

In an embodiment, the apparatus further comprises a colored layer, the colored layer being provided on a surface of the pattern layer away from the bearing layer.

It can be seen from the technical solution provided by the embodiments of this disclosure that the apparatus provided by the embodiments of this disclosure includes a bearing layer, an adhesive layer and a pattern layer. Wherein, the pattern layer is adhered to the bearing layer via the adhesive layer, and the pattern layer includes a body and pattern structures integrated with the body, that is, the pattern layer is of a single-layer structure and has no substrate. Therefore, the purpose of reducing the overall thickness of the device can be achieved. And furthermore, as an adhesion process is used for the pattern layer and the bearing layer, a requirement on a shape of the bearing layer is not high, and a plane or curved surface process is simple.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. It is obvious that the accompanying drawings in the following description are some embodiments of this disclosure, and for those of ordinary skills in the art, other accompanying drawings may be obtained according to these accompanying drawings without making an inventive effort.

DETAILED DESCRIPTION

A description of example embodiments follows.

An embodiment of this disclosure provides an apparatus having a decorative pattern. For easy understanding of the technical solution in this disclosure by those skilled in the art, this disclosure shall be described clearly and fully below with reference to the accompanying drawings in the embodiment of this disclosure. It is obvious that the described embodiments are a part of the embodiments of this disclosure, but not all the embodiments of this disclosure. Other embodiments obtained by those skilled in the art based on the embodiments of this disclosure without making an inventive effort are under coverage of the scope of this disclosure.

To be noted, when an element is described as being "disposed/provided" on another element, it may be located on another element directly, or there may be an intermediate element. When an element is described as being "connected to" another element, it may be connected to another element directly, or there may be an intermediate element. The terms "vertical", "horizontal", "upper", "lower", "left", "right", and the like used herein are just for the purpose of description, rather than indicating a unique embodiment.

Unless otherwise defined, all of the technical and scientific terms used herein are the same as those commonly understood by a person skilled in the technical field of the present disclosure. The terms used in the specification of the present application are just for the purpose of illustrating the specific embodiments, rather than limiting the present disclosure. The term "and/or" used herein includes any and all combinations of one or more related items listed.

Figure 2:
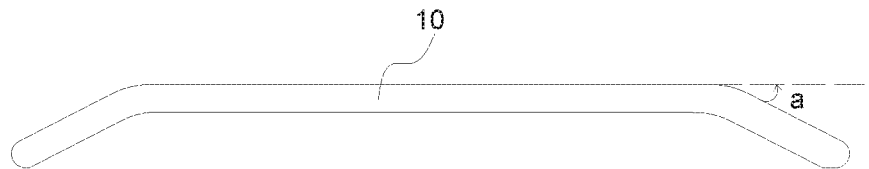
FIG. 2 is a schematic diagram of a structure of a bearing layer having edges of curved surfaces.

An embodiment of this application provides an apparatus having a decorative pattern. As shown in FIG. 2, the apparatus may include a bearing layer 10, an adhesive layer 20 and a pattern layer 30. Wherein, the bearing layer 10 has a first surface and a second surface opposite to each other; the adhesive layer 20 is located on the first surface of the bearing layer 10; and the pattern layer 30 is located on a surface of the adhesive layer 20 away from the bearing layer 10 and is connected to the first surface of the bearing layer 10 via the adhesive layer 20. The pattern layer 30 may be constituted by a body and a pattern structure integrated with the body.

Figure 3:
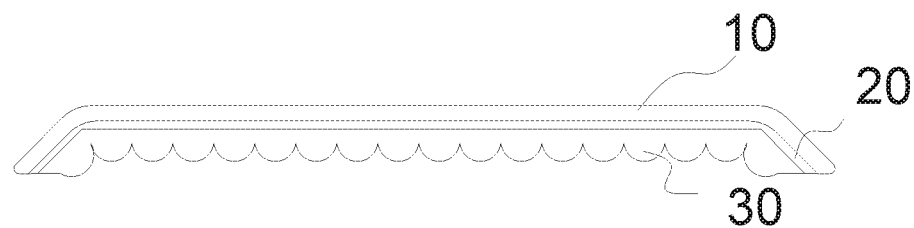
FIG. 3 is a schematic diagram of a structure of an apparatus having a decorative pattern of another embodiment of this disclosure.

The bearing layer 10 may be a glass, or a metal plate, or a hard film, or a high polymer flexible film or a housing for providing load bearing. A surface of the bearing layer 10 may be at least partially a plane, or a curved surface, or a combination thereof. When an edge of the bearing layer 10 is a curved surface, an included angle between an edge part of its curved surface and a horizontal direction may be 0-90 degrees, as shown in FIG. 2. And at this moment, edges of the adhesive layer 20 and the pattern layer 30 are also curved surfaces, as shown in FIG. 3.

The adhesive layer 20 may be used for adhering the pattern layer 30 to the bearing layer 10, and the material of the adhesive layer 20 may be an optically clear adhesive (OCA), a pressure sensitive adhesive (PSA), a thermoplastic elastomer and/or an ethylene-vinyl acetate copolymer, etc. However, this disclosure is not limited thereto, and a suitable material may be selected for making the adhesive layer 20 according to different applications in other embodiments.

Figure 4:
FIG. 4 is a schematic diagram of a structure of a pattern structure.

The pattern layer 30 may include a body 31 made of a polymer and a pattern structure 32 embedded in the body 31, as shown in FIG. 4. The pattern structure 32 is integral with the body 31. A height of a top of the pattern structure 32 may be equal to a height of a top of the body 31, or may be higher than the height of the top of the body 31. And the pattern structure 32 may also be located inside the body 31.

Figure 1:
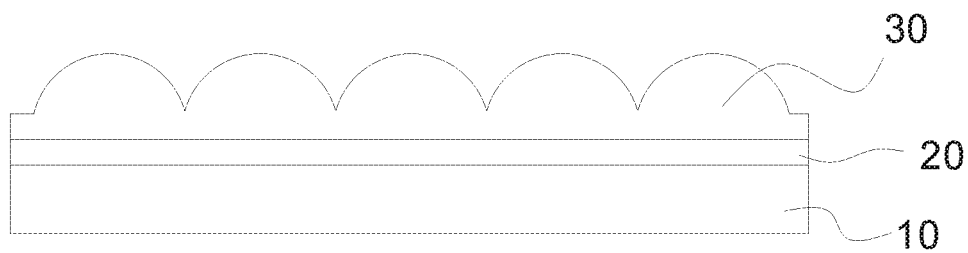
FIG. 1 is a schematic diagram of a structure of an apparatus having a decorative pattern of an embodiment of this disclosure.
Figure 5:
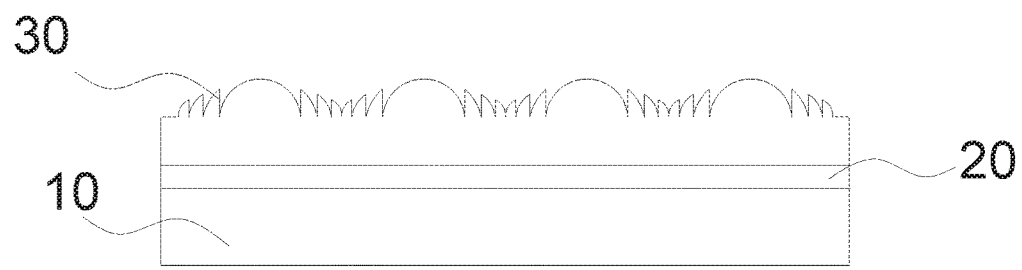
FIG. 5 is a schematic diagram of a structure of the pattern structure which is a Fresnel lens.

In at least one embodiment, the pattern structure 32 may be formed by mould pressing the polymer making the body 31 by using a mould having a preset pattern. The moulded pattern structure 32 may be in a convex shape, as shown in FIG. 1. The convex shape may be one or more of a prism, a microlens and a Fresnel lens; however, it is not limited thereto. FIG. 5 is a schematic diagram of a structure of the pattern structure which is a Fresnel lens. As the pattern structure 32 is formed by directly pressing on the polymer making the body 31, the pattern structure 32 is integral with the body 31.

Figure 6:
FIG. 6 is a schematic diagram of another structure of the pattern structure.
Figure 7:
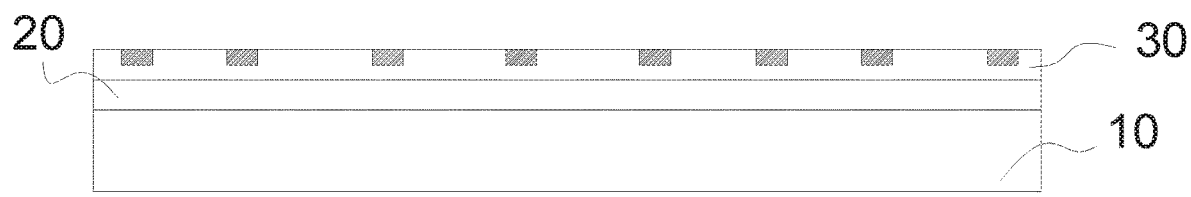
FIG. 7 is a schematic diagram of a structure of an apparatus having a decorative pattern of a further embodiment of this disclosure.
Figure 8:
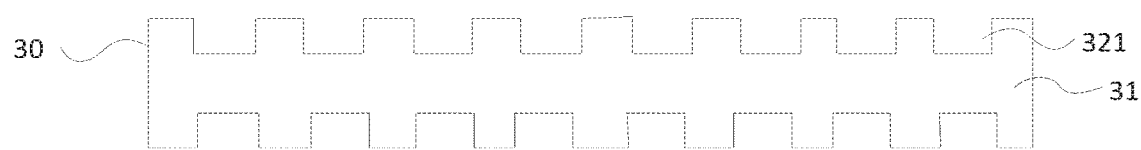
FIG. 8 is a schematic diagram of a structure having a double-sided accommodation structure.

In at least one embodiment, the pattern structure 32 may also be formed by forming an accommodation structure 321 (such as a groove) in the polymer making the body 31 and filling a filler in the accommodation structure 321, as shown in FIG. 6. At this moment, a structure of the apparatus is as shown in FIG. 7. The accommodation structure may be located at one side of the polymer, or may be located at two opposite sides in the polymer, as shown in FIG. 8. At this moment, the obtained pattern structure 32 is located at two opposite sides in the body 31. There is no boundary between the accommodation structure and the body 31, hence, the pattern structure 32 is integral with the body 31.

The polymer may be one type of polymer. This type of polymer may be a single polymer, or may be a mixed polymer that is a mixture of multiple individual polymers that do not react. Light transmittance of the polymer may be greater than 70%, that is, the polymer may be of a transparent color or visually transparent. The polymer may be a heat-curing adhesive and/or an optically-curing adhesive, such as a UV adhesive.

The polymer may also be two types of polymers, and a fusion portion may be formed at a neighboring part between the two types of polymers. The neighboring part may be a contact part between the two types of polymers when the two types of polymers are pressed by using the mould to form an accommodation portion. The fusion portion may be an area formed by fusing the two types of polymers at a preset proportion. The preset proportion may be N:M; where, N and M are contents of the two types of polymers in the fusion portion, values of which being 0-100%, exclusive of 0 and 100. Hence, the body and the accommodation structure may be deemed as an integral structure, and there is no interface between the body and the accommodation structure, or there is no obvious boundary between layers in a cross section of the pattern layer or a presented boundary is not a regular boundary.

The filler may be a material having a refractive index to light different from that of the polymer, including a colored material, a dying material, a metal material, a conductive material, or the like, such as an ink. It should be noted that the color of the filler may be different from that of the polymer, so that when people observe the pattern structure, patterns in the pattern structure may be clearly distinguished. The patterns may be a pattern or a micro-pattern, or may be multiple identical or different patterns or micro-patterns (i.e. micron-level patterns), such as patterns having easily distinguishable shapes, e.g. graphics, grids, texts, numbers, symbols, landscapes, and/or logos, etc. The different (micro-)patterns may be that sizes of the (micro-)patterns are different, or may be that shapes of the (micro) patterns are different, or may be that constitutions of the (micro-)patterns are different. For example, a first (micro-)pattern is a name of a company, and a second (micro-)pattern is a company logo.

It can be seen from the above description that the apparatus having a decorative pattern provided by the embodiments of this disclosure includes the adapted bearing layer, adhesive layer and pattern layer; wherein the pattern layer is connected to the bearing layer via the adhesive layer. The pattern layer includes the body and the pattern structure integrated with the body. This makes that the pattern layer is a single-layer structure, but not a multi-layer structure. Hence, a thickness of the pattern layer may be reduced, and the purpose of reducing the overall thickness of the device can be achieved.

Figure 9:
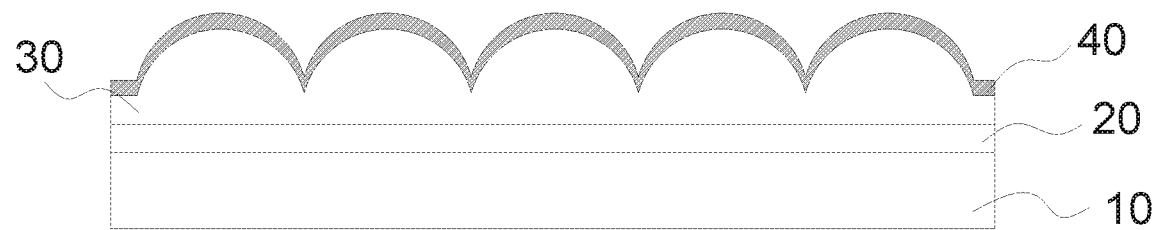
FIG. 9 is a schematic diagram of a structure of an apparatus having a decorative pattern of still another embodiment of this disclosure.

In at least one embodiment, the apparatus may further include a reflective layer 40, as shown in FIG. 9. The reflective layer 40 may be provided on a surface of the pattern layer 30 away from the bearing layer 10, and may cover an outer surface of the pattern layer, or cover a part of the outer surface of the pattern layer. The reflective layer 40 may be a metal layer obtained by electroplating. And material of the reflective layer 40 may be made of metal nitride. The reflective layer 40 may be used for reflecting patterns in the pattern layer 30, so that patterns may be observed at a side where the second surface of the bearing layer 10 is located. This may enhance presentation effects of graphics and texts, which is advantageous to improvement of user experiences.

Figure 10:
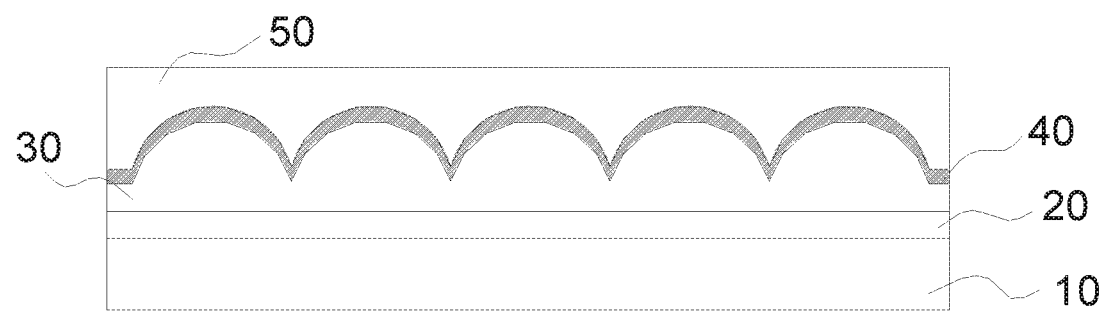
FIG. 10 is a schematic diagram of a structure of an apparatus having a decorative pattern of yet another embodiment of this disclosure.

In at least one embodiment, the apparatus may further include a colored layer 50. The colored layer 50 may be provided on a surface of the pattern layer 30 away from the bearing layer 10, or on a surface of the reflective layer 40 away from the pattern layer 30, as shown in FIG. 10. The colored layer 50 may cover an outer surface of the pattern layer 30 or the reflective layer 40, or cover a part of the outer surface of the pattern layer 30 or the reflective layer 40. The colored layer 50 may be formed by printing a single-color or colored ink, a color of the ink being different from that of the ink filled in the groove. The colored layer 50 may be used for coloring the patterns in the pattern layer 30, so as to make colors of the patterns in the pattern layer 30 varied and presentation of the patterns more clear, and this is also advantageous to improvement of user experiences.

Figure 11:
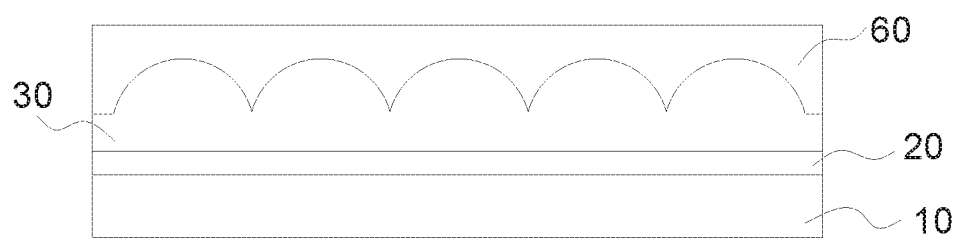
FIG. 11 is a schematic diagram of a structure of an apparatus having a decorative pattern of further still another embodiment of this disclosure.

In at least one embodiment, the apparatus may further include a protective layer 60, as shown in FIG. 11. The protective layer 60 may be provided over the pattern layer 30, so as to prevent the pattern layer 30 from being polluted or destroyed by the outside environment.

Figure 12:
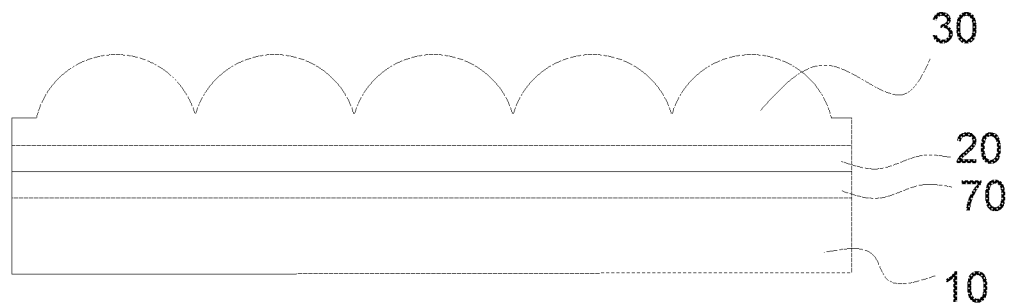
FIG. 12 is a schematic diagram of a structure of an apparatus having a decorative pattern of yet still another embodiment of this disclosure.

In at least one embodiment, the apparatus may further include a release layer 70, as shown in FIG. 12. The release layer 70 may be located between the bearing layer 10 and the adhesive layer 20, or may be located between the adhesive layer 20 and the pattern layer 30, and is mainly used for making the bearing layer and the pattern layer separated after transfer.

The apparatus having a decorative pattern provided by the embodiments of this disclosure may be applicable to electronic devices, such as a mobile phone, a desktop computer, a tablet computer, and a notebook computer, etc., and home appliances, such as a refrigerator, an air conditioner, a washing machine, and a TV set, etc.; however, it is not limited thereto.

Figure 13:
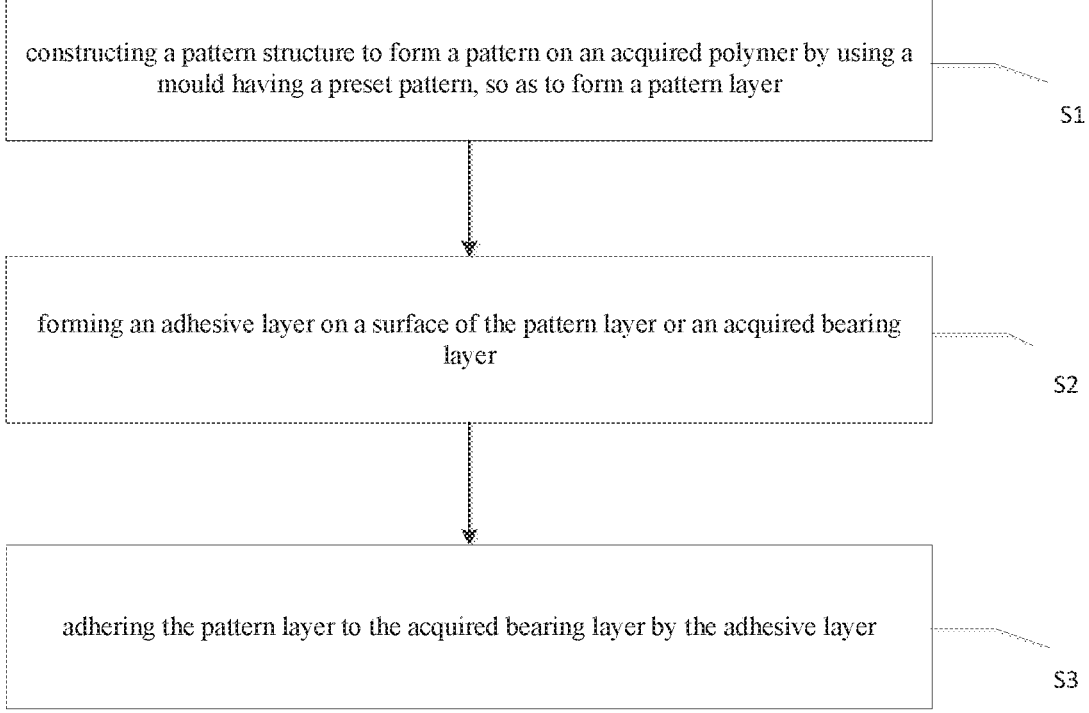
FIG. 13 is a flowchart of a method of making an apparatus having a decorative pattern provided by an embodiment of this disclosure.

The embodiments of this disclosure further provide a method for making the apparatus having a decorative pattern provided by the above embodiments, as shown in FIG. 13. The method may include steps of:

S1: constructing a pattern structure to form a pattern on an acquired polymer by using a mould having a preset pattern, so as to form a pattern layer.

The polymer presents a colloidal state at a normal temperature and pressure.

After the polymer is acquired, the pattern structure may be directly constructed on the acquired polymer, so as to form the pattern layer. Or a release film is provided first on a substrate, then the acquired polymer is coated on a surface of the release film away from the substrate, thereafter, the pattern structure is constructed on the polymer to obtain the pattern layer, and finally, the pattern layer is removed from the release film.

In an embodiment, the constructing a pattern structure on an acquired polymer so as to form a pattern layer may include: impressing a side of the acquired polymer by using the mould having a preset pattern, so as to form a projection on the polymer; and then curing the polymer, the cured projection forming the pattern structure. And non-projected portions of the polymer constitute the body.

In another embodiment, the constructing a pattern structure on an acquired polymer so as to form a pattern layer may include: impressing a side or opposite two sides of the acquired polymer by using the mould having a preset pattern, so as to form an accommodation structure on the polymer; then curing the formed accommodation structure; and finally filling a filler in the cured accommodation structure, so as to form the pattern structure. And other portions in the polymer other than the accommodation structure constitute the body.

The pattern structure and the body constitute the pattern layer.

S2: forming an adhesive layer on a surface of the pattern layer or an acquired bearing layer.

In an embodiment, an adhesive (or a double-sided tape) may be directly coated on the surface of the pattern layer or the acquired bearing layer, so as to form the adhesive layer; or a release layer may be first provided on a substrate, and then an adhesive (or a double-sided tape) may be coated on a surface of the release film away from the substrate, so as to form the adhesive layer; then the acquired polymer is coated on the adhesive layer and the pattern structure is constructed on the polymer, so as to obtain the pattern layer; and finally, the pattern layer and the adhesive layer are removed from the release film.

S3: adhering the pattern layer to the acquired bearing layer by the adhesive layer.

After the pattern layer is formed, the pattern layer may be adhered to the acquired bearing layer by the adhesive layer. In particular, a surface of the pattern layer on which the adhesive layer is formed is adhered to a surface (i.e. a first surface) of the acquired bearing layer, or the surface of the pattern layer on which the adhesive layer is formed is adhered to a surface of the pattern layer.

It can be seen from the above steps that in the embodiments of this disclosure, the pattern structure is constructed on the acquired polymer by using the mould having a preset pattern, so as to form the pattern layer; and the pattern layer is adhered to the acquired bearing layer by the adhesive layer, so as to obtain the apparatus. The apparatus has no substrate, and the pattern layer is of a single-layer structure, thereby achieving an object of reducing an overall thickness of the apparatus.

In another embodiment, after the pattern layer is formed, the method may further include:

S4: forming a reflective layer on a surface of the pattern layer.

In an embodiment, before adhering the formed pattern layer to the bearing layer, a metal may be electroplated on a surface of the pattern layer, so as to form the reflective layer; and then a surface in the pattern layer opposite to the reflective layer is adhered to the bearing layer.

In an embodiment, after adhering the formed pattern layer to the bearing layer, a metal may be electroplated on a surface of the pattern layer away from the bearing layer, so as to form the reflective layer.

S5: forming a colored layer on a surface of the reflective layer away from the pattern layer.

After the reflective layer is formed on the surface of the pattern layer, the colored layer may be formed on the surface of the reflective layer away from the pattern layer by printing.

Any numerical values cited in this application include all values between the lower-limit value and the upper-limit value in increments of one unit from the lower-limit value to the upper-limit value, only if an interval of at least two units exists between any lower value and any higher value. For example, if a value elaborating a number or a process variable (e.g. temperature, pressure, time, etc.) of a component is from 1 to 90, preferably from 20 to 80, more preferably from 30 to 70, the purpose is to illustrate that the specification also explicitly lists such values as 15 to 85, 22 to 68, 43 to 51, and 30 to 32, etc. For values less than 1, it is appropriately deeded that one unit is 0.0001, 0.001, 0.01, 0.1. These are merely examples that are intended to be explicit expressed, and it is believed that all possible combinations of numerical values enumerated between the lowest value and the highest value are expressly elaborated in this description in a similar manner.

Unless otherwise specified, all ranges include all numbers of endpoints and between the endpoints. "About" or "approximately" used with a range is suitable for the two ends of the range. Thus, "about 20 to 30" is intended to cover "about 20 to about 30", including at least the indicated endpoints.

All articles and references disclosed, including patent applications and publications, are incorporated herein by reference for all purposes. The term "consisting substantially of" describing a combination shall include a specified element, ingredient, component or step, and other element, ingredient, component or step that does not substantially affect the basic novel features of the combination. Use of the terms "comprising" or "including" to describe combinations of elements, ingredients, components, or steps herein also contemplate embodiments that consist essentially of such elements, ingredients, components, or steps. Here, by using the term "may", it is intended that any attribute described by "may" be included is optional.

Multiple elements, components, parts or steps may be provided by a single integrated element, component, part or step. Alternatively, a single integrated element, component, part or step may be divided into separate multiple elements, components, parts or steps. The disclosure, "a" or "an", used to describe elements, components, pars, or steps, does not imply that other elements, components, parts, or steps are excluded.

The embodiments in this description are described in a progressive manner, the same or similar parts among these embodiments may be referred to each other, and each embodiment focuses on the difference from other embodiments.

In order that the above objects, features and benefits of this disclosure to be more clear and easy to be understood, particular embodiments of this disclosure are described above in detail with reference to the accompanying drawings. Many details are given in the above description, so that this disclosure is fully understood. However, this disclosure may be carried out in many other ways than those described above, and similar modifications may be made by those skilled in the art without departing from the spirits of this disclosure, hence, this disclosure is not limited to the particular embodiments disclosed above. And furthermore, various technical features of the above embodiments may be arbitrarily combined. For the sake of simplicity of description, not all possible combinations of the various technical features of the above embodiments are described; however, combinations of these technical features should be deemed as being within the scope of this description only if there exists no contradiction therebetween.

The above embodiments only express some implementations of this disclosure, and their description is particular and in detail; however, it should be understood that they are not intended to limit the protection scope of the disclosure. It should be noted that any modifications, improvements and the like may be made by those skilled in the art within the spirit and principles of this disclosure. Therefore, the protection scope of the disclosure should be defined by the appended claims.

What is claimed is:

1. An apparatus having a decorative pattern, characterized in that the apparatus comprises:
    a bearing layer having a first surface and a second surface opposite to each other;
    an adhesive layer provided on the first surface of the bearing layer;
    a pattern layer provided on a surface of the adhesive layer away from the bearing layer and comprising a body and a pattern structure integrated with the body, wherein the body is made of polymer, wherein the polymer is a heat-curing adhesive and/or an optically-curing adhesive and light transmittance of the polymer is greater than 70%, and wherein the pattern structure is formed by pressing and wherein the pattern layer is a single-layer structure; wherein the pattern layer is connected to the first surface of the bearing layer via the adhesive layer;
    a reflective layer provided on a surface of the pattern layer away from the bearing layer, wherein the reflective layer is used for reflecting patterns in the pattern layer, so that graphics and texts of which presentation effects are enhanced or patterns can be observed at a side where the second surface of the bearing layer is located; and a colored layer provided on a surface of the reflective layer away from the pattern layer, wherein the colored layer covers an outer surface of the reflective layer.

2. The apparatus according to claim 1, characterized in that an accommodation structure is provided on the body, so as to accommodate a filler to form the pattern structure; and the filler is a material having a refractive index to light different from that of the polymer, the filler including a colored material, a dyeing material, a metal material or a conductive material; a color of the filler is different from that of the polymer; the colored layer is formed by printing a single-color or colored ink, a color of the ink is different from that of the ink filled in the accommodation structure.

3. The apparatus according to claim 2, characterized in that the pattern structure is located at two opposite sides in the body.

4. The apparatus according to claim 2, characterized in that the pattern structure is located inside the body.

5. The apparatus according to claim 1, characterized in that the pattern structure is located at two opposite sides in the body.

6. The apparatus according to claim 1, characterized in that the pattern structure is located inside the body.

7. The apparatus according to claim 1, characterized in that the pattern structure is in a convex shape.

8. The apparatus according to claim 1, characterized in that the pattern structure comprises one of a prism, a microlens and a Fresnel lens, or a combination thereof.

9. The apparatus according to claim 1, characterized in that a surface of the bearing layer comprises a plane, or a curved surface, or a combination thereof.

10. The apparatus according to claim 9, characterized in that an included angle between an edge of the surface of the bearing layer and a horizontal direction is 0-90 degrees.

11. The apparatus according to claim 1, characterized in that the bearing layer comprises a glass, or a metal plate, or a film.

12. The apparatus according to claim 1, characterized in that the apparatus further comprises a colored layer, the colored layer being provided on a surface of the pattern layer away from the bearing layer.

* * * * *

UNITED STATES PATENT AND TRADEMARK OFFICE
CERTIFICATE OF CORRECTION

PATENT NO. : 10,696,091 B2  
APPLICATION NO. : 16/010256  
DATED : June 30, 2020  
INVENTOR(S) : Jian Zhang Page 1 of 1

It is certified that error appears in the above-identified patent and that said Letters Patent is hereby corrected as shown below:

On the Title Page

In Item (63), Related U.S. Application Data, delete "PCT/CN2016/010036" and insert --PCT/CN2016/110036--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*